US008686589B2

(12) United States Patent
Pereira

(10) Patent No.: US 8,686,589 B2
(45) Date of Patent: Apr. 1, 2014

(54) DEVICE FOR CONTROLLING MAINTENANCE ACTUATORS FOR THE COWLINGS OF A TURBOJET ENGINE NACELLE

(75) Inventor: David Pereira, Limours (FR)

(73) Assignee: Aircelle, Gonfreville l'Orcher (FR)

( * ) Notice: Subject to any disclaimer, the term of this patent is extended or adjusted under 35 U.S.C. 154(b) by 1045 days.

(21) Appl. No.: 12/673,868

(22) PCT Filed: Jul. 16, 2008

(86) PCT No.: PCT/FR2008/001046
§ 371 (c)(1),
(2), (4) Date: Feb. 17, 2010

(87) PCT Pub. No.: WO2009/030836
PCT Pub. Date: Mar. 12, 2009

(65) Prior Publication Data
US 2011/0250054 A1    Oct. 13, 2011

(30) Foreign Application Priority Data
Aug. 20, 2007    (FR) ..................... 07 05931

(51) Int. Cl.
*B64D 29/00*    (2006.01)
(52) U.S. Cl.
USPC .......................................... 307/9.1; 307/115
(58) Field of Classification Search
USPC .................................................. 307/9.1, 115
See application file for complete search history.

(56) References Cited

U.S. PATENT DOCUMENTS

| 4,399,966 | A | * | 8/1983 | Crudden et al. | ............ 244/129.4 |
| 5,960,626 | A | * | 10/1999 | Baudu et al. | ................. 60/226.2 |
| 6,622,963 | B1 | | 9/2003 | Ahrendt | |

(Continued)

FOREIGN PATENT DOCUMENTS

| EP | 0869271 A1 | 10/1998 |
| EP | 1280029 A2 * | 1/2003 |
| EP | 2181040 B1 * | 11/2011 |
| WO | 2006134253 A1 | 12/2006 |

OTHER PUBLICATIONS

International Search Report PCT/FR2008/001046; Dated Mar. 26, 2009.

*Primary Examiner* — Fritz M Fleming
(74) *Attorney, Agent, or Firm* — Brinks Gilson & Lione

(57) ABSTRACT

The invention relates to a device (9) for controlling the maintenance actuators (7a, 7b) of the cowlings of a turbojet engine nacelle of an aircraft, that comprises a first stage (12) to be connected to an electric power network (10) of the aircraft, at least one second power stage (13a, 13b) including converters of a first DC voltage from the first stage (12) into a second DC voltage for powering at least one maintenance actuator (7a, 7b) connected downstream from the device (9), a control means (14) for the first and second stages (12, 13a, 13b), and a means (15) for establishing a communication between the control means (14) and at least one control housing (16a, 16b) so that a user can control the operation of the actuators, the control means being arranged so as to carry out switching operations between a first operation mode in which the second stage(s) (13a, 13b) are powered, and a second standby mode in which the second stage(s) (13a, 13b) are not powered by the first stage (12).

13 Claims, 3 Drawing Sheets

(56) References Cited

U.S. PATENT DOCUMENTS

| | | | |
|---|---|---|---|
| 6,664,656 B2 * | 12/2003 | Bernier | 307/9.1 |
| 7,954,759 B2 * | 6/2011 | Marin Martinod | 244/110 B |
| 2004/0139726 A1 * | 7/2004 | Colotte et al. | 60/226.2 |
| 2007/0259545 A1 * | 11/2007 | Berenger | 439/135 |
| 2010/0201190 A1 * | 8/2010 | Pereira | 307/9.1 |
| 2010/0283319 A1 * | 11/2010 | Boudyaf et al. | 307/9.1 |
| 2011/0014043 A1 * | 1/2011 | Pereira et al. | 415/211.2 |
| 2011/0250054 A1 * | 10/2011 | Pereira | 415/126 |

* cited by examiner

DEVICE FOR CONTROLLING MAINTENANCE ACTUATORS FOR THE COWLINGS OF A TURBOJET ENGINE NACELLE

TECHNICAL FIELD

The invention relates to a device for controlling maintenance actuators of cowlings of an aircraft turbojet engine nacelle, and to a nacelle including such a device.

BACKGROUND

An aircraft is moved by a number of turbojet engines, each housed in a nacelle that also houses a set of ancillary actuation devices linked to its operation and handling various functions when the turbojet engine is operating or stopped. These ancillary actuation devices notably comprise a mechanical system for actuating thrust reversers.

A nacelle generally has a tubular structure comprising an air inlet at the front of the turbojet engine, a mid section intended to surround a fan of the turbojet engine, a rear section intended to channel the secondary air stream from the turbojet engine and being able to house thrust reversal means, and is generally terminated by an exhaust nozzle whose output is situated downstream of the turbojet engine.

The modern nacelles are often designed to house a dual-stream turbojet engine able to generate, via blades of the rotating fan, a secondary cold air stream that is added to the primary stream of hot gases obtained from the turbine of the turbojet engine.

A nacelle generally has an outer structure, called outer fixed structure (OFS), which defines, with a concentric inner structure, called inner fixed structure (IFS), comprising a cowling surrounding the structure of the turbojet engine proper behind the fan, an annular flow channel, also called duct, designed to channel a cold air stream, called secondary, that circulates outside the turbojet engine. The primary and secondary streams are ejected from the turbojet engine through the rear of the nacelle.

Each propulsion system of the airplane thus comprises a nacelle and a turbojet engine, and is suspended from a fixed structure of the airplane, for example under a wing or on the fuselage, via a strut attached to the turbojet engine or to the nacelle.

The nacelle comprises at least one pair of cowlings, usually consisting of two half-shells of substantially semi-cylindrical form, on either side of a longitudinal vertical plane of symmetry of the nacelle, and mounted to move so as to be able to be deployed between a working position and a maintenance position in order to allow access to the turbojet engine.

The two cowlings are generally mounted to pivot about a hinge-forming longitudinal axis in the top portion (at 12 o'clock) of the reverser. The cowlings are held in the closed position by means of locks positioned along a junction line situated in the bottom portion (at 6 o'clock).

The nacelle can include, for example, a pair of fan cowlings, designed to cover the fan portion of the turbojet engine, and a pair of reverser cowlings, comprising a thrust reverser and covering the rear portion of the turbojet engine.

Each cowling is opened using at least one actuator, for example a cylinder, and is held open using at least one connecting rod, the actuator and the connecting rod each having a first end generally fixed to the turbojet engine and a second end fixed to the cowling.

As is known, the actuators can be produced in the form of hydraulic actuators.

It is also known to use electromechanical actuators to displace certain portions of the nacelle, such as the thrust reverser cowlings, as described in the document EP0843089. These actuators generally include an electromechanical brake for holding in the deployed position. This brake can have a rest position, the electrical power supply being disconnected, in unlocked mode or in locked mode, depending on the applications.

The document U.S. Pat. No. 6,622,963 describes, for its part, a control system wherein different means of controlling the movements of the cowling can be linked to one and the same source through the intermediary of a switch. Such a system does not make it possible on its own to be able to control several actuator motors using different power supply voltages.

Indeed, in their electromechanical version, the actuators of fan and thrust reverser cowlings can use distinct power sources. Connecting these actuators to the aircraft power supply network poses the following problems.

The presence of several actuators, that do not necessarily use the same power supply voltage, entails producing an electronic unit that handles a number of conversions of the power supply voltage to each of the power supply voltages of the actuators.

Furthermore, the presence of the actuators generates conducted and radiated disturbances on the network that necessitate filtering of the signal in this electronic unit.

This electronic unit is powered up when the airplane is on the ground and the engine is stopped. Now, its confined environment between the cowlings of the nacelle and the engine subjects it to thermal stresses after the engine has been stopped: it is subject to the solar radiation on the cowlings and to the radiation from the engine that is still hot after the flight. Keeping the unit powered up, with the actuators at rest and the cowlings closed, also brings about a release of heat specific to the unit which can affect the thermal dimensioning of the latter.

BRIEF SUMMARY

The aim of the disclosure is to remedy the drawbacks described previously, and in particular make it possible to avoid thermal overdimensioning of the components and their energy consumption in standby mode, as well as limit the disturbances on the aircraft's electrical power supply network due to the presence of multiple actuators.

To this end, the subject of the invention is a device for controlling maintenance actuators of cowlings of an aircraft turbojet engine nacelle comprising:

a first stage to be connected to an electrical power supply network of the aircraft, at least one second power stage comprising converters of a first DC voltage originating from the first stage to a second DC voltage for electrically powering at least one maintenance actuator connected downstream of the device, means of controlling the first and second stages, and means of establishing communication between the control means and at least one control unit enabling a user to control the operation of the actuators, the control means being arranged to carry out switchovers between a first operating mode in which the second stage or stages are powered and a second standby mode in which the second stage or stages are not powered by the first stage.

Thanks to the provisions according to the invention, the electrical consumption of all the actuators and the device is optimized in standby mode by the control means, which comprise, for example, one or more electronic cards. Only components with low energy consumption are powered. The power stages are not powered, and the actuators are therefore not powered. An action on one of the control units of one of the actuators, which can comprise, for example, a switch or a remote pushbutton, causes the power stages to be powered up, which makes it possible to use the maintenance actuators.

It is thus possible to do away with thermal overdimensioning of the units. These provisions are particularly important in the case of high outside temperature conditions, for example between 30 and 55° C. In these conditions, the temperature under a closed cowling can climb to 90° C. It is best in these conditions to avoid any production of heat that can damage the components.

Furthermore, the presence of the standby means makes it possible to avoid having the actuators powered in flight should it be forgotten to disconnect the maintenance electrical network before takeoff or accidental startup, which could disturb other components.

Furthermore, these provisions make it possible to increase the duration of use of the electronic components of the actuators which are powered up for less time.

Advantageously, the control means are arranged to bring about the switchover from the first operating mode to the second standby mode according to the detection of a state of closure of at least one cowling.

These provisions make it possible to carry out a switchover to standby mode without the intervention of a user, from the position of the cowlings. Thus, the standby mode is active only when the cowling or cowlings are closed.

Advantageously, the control means are arranged to bring about the switchover from the second standby mode to the first operating mode according to the reception of a control instruction from a control unit.

According to one embodiment, the switchover from the second standby mode to the first operating mode is applied only when this control instruction has been initiated after the power supply network has been powered up.

Advantageously, at least a portion of the first stage is not powered in standby mode.

According to one embodiment, the open or closed position of a cowling is detected by comparing the energy consumption of the actuator of the cowling and/or of the brake of the actuator with one or more predetermined values.

These provisions make it possible to detect the position of the cowling, open or closed, without the use of dedicated position sensors.

Advantageously, the energy consumption of the actuator is measured when the cowling is in a static position.

According to one embodiment, the device comprises at least two second stages supplying distinct power supply voltages to distinct actuators.

Advantageously, the device has a third diagnostic mode in which the device supplies information on its state to an output of a second stage.

These provisions make it possible, simply and without involving a communication bus, to know the state of the device by reading the voltage or frequency level on an output of a second stage preferably operating at low voltage, voltage or frequency thresholds making it possible to know the failure modes.

According to one embodiment, the control means bring about the switchover to diagnostic mode of the device upon receipt of a sequence of specific control instructions from a control unit.

These provisions make it possible to do away with a specific control interface for the diagnostic mode.

The present invention also relates to a nacelle including a device as described hereinabove.

According to one possibility, the device is positioned in the fan housing of the turbojet engine.

According to another possibility, the device is positioned in the strut securing the nacelle to the wing of the aircraft.

This provision makes it possible to reduce the thermal stresses for the device by distancing it from the turbojet engine.

BRIEF DESCRIPTION OF THE DRAWINGS

In any case, the invention will be clearly understood with the help of the following description, given with reference to the appended diagrammatic drawing representing, by way of nonlimiting example, one embodiment of this device.

DETAILED DESCRIPTION

Figure 1:
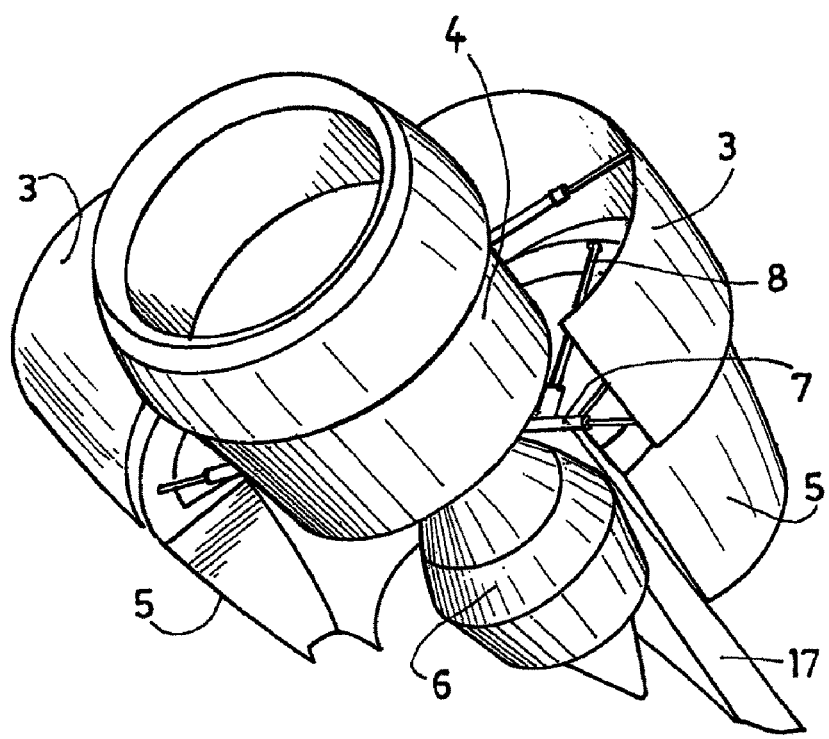
FIG. 1 is a diagrammatic general view of a nacelle and of a turbojet engine in perspective from below, the fan and reverser cowlings being open.
Figure 2:
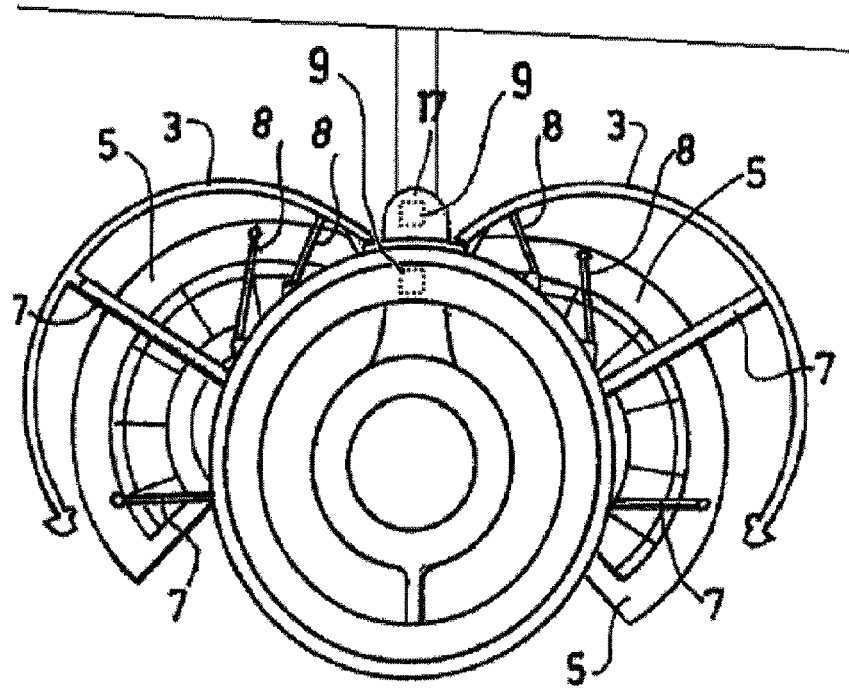
FIG. 2 is a diagrammatic front view of the nacelle of FIG. 1.

As represented in FIGS. 1 and 2, an aircraft nacelle comprises, in a known manner, as described previously, a pair of fan cowlings 3, for covering the fan portion of the turbojet engine 4, and a pair of reverser cowlings 5, comprising a thrust reverser and covering the rear portion 6 of the turbojet engine.

These cowlings 3, 4 are driven in movement between their closed and open positions by an actuator comprising, for example, an electromechanical cylinder 7 and held in the open position by a connecting rod 8, as can be seen notably in FIG. 2.

Figure 3:
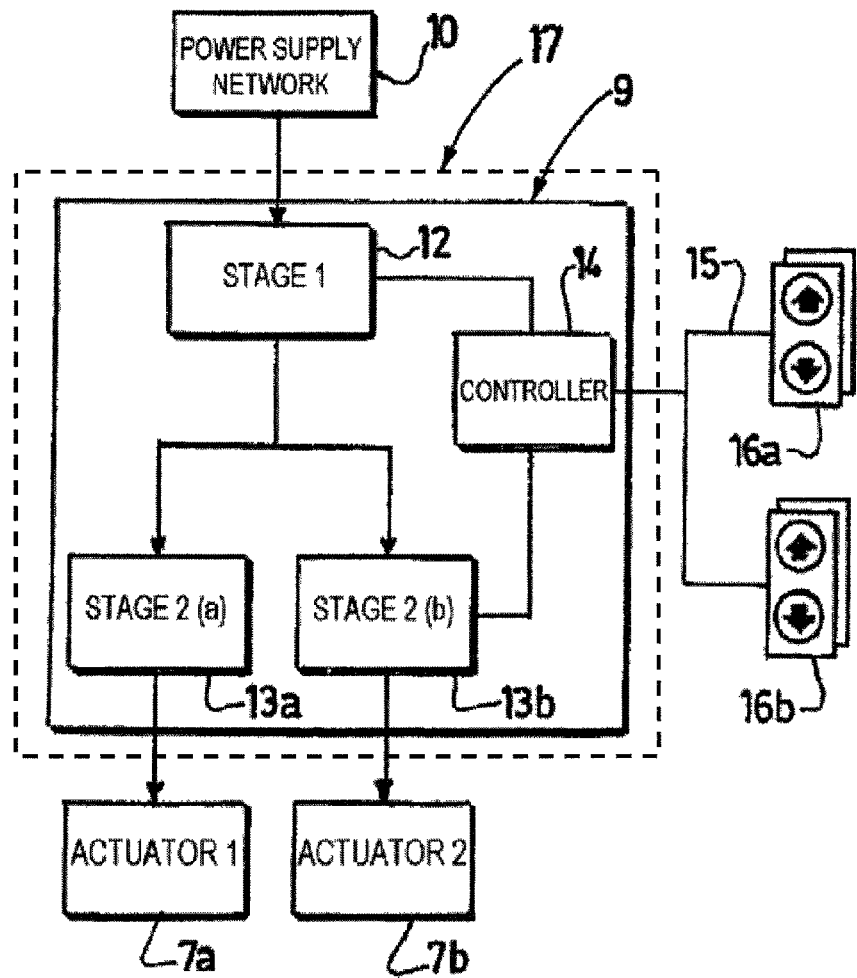
FIG. 3 is a diagrammatic representation of a device according to the invention.

According to the invention, the nacelle includes a device 9 for controlling maintenance actuators 7 diagrammatically represented in FIG. 3.

This device 9 comprises a first stage 12 to which is connected an electrical power supply network 10 of the aircraft, which supplies, in the usual manner, a three-phase alternating voltage. This first stage 12 comprises, in particular, an AC voltage to DC voltage converter, comprising a voltage rectifier and a voltage step-up component, for example to supply a DC voltage of the order of several hundreds of volts.

The control device 12 also includes at least two second power stages 13a, 13b for powering at least two maintenance actuators 7a, 7b linked downstream to the device. In particular, the second power stages 13a, 13b comprise converters of a first DC voltage originating from the first stage to a second DC voltage intended to power an actuator.

These second stages supply distinct power supply voltages to distinct actuators. In particular, two very different voltages of the order, respectively, of a few tens of volts on the one hand and a few hundreds of volts on the other hand can be supplied to two distinct actuators 7 by two second stages 13a and 13b.

The device further comprises means of controlling the first and second stages 12, 13a, 13b, consisting of a microcontroller 14.

The microcontroller 14 is linked by means for establishing communication 15, for example of wired type, with at least one actuator control unit 16a, 16b intended for a user.

The microcontroller 14 is arranged to produce a standby mode making it possible to eliminate the electrical power supply for the maintenance actuators 7a, 7b or reestablish this power supply upon a control instruction originating from the control units 16a, 16b.

When set to standby, the second stages 13a, 13b are deactivated, as is the voltage step-up component of the first stage 12, so as to significantly reduce the electrical consumption of the device.

The actuators are set to standby when the cowlings 3, 5 are in the closed position.

In order to determine the position of the cowlings 3, 5, the microcontroller 14 detects the open or closed position of the cowling 3, 5 by comparing the energy consumption of the actuator 7a, 7b or of the brake of the actuator with one or more determined values.

In practice, the electrical consumption of an actuator 7 differs according to whether the actuator is in the retracted, intermediate or deployed position, which corresponds to closed, intermediate or open positions of the corresponding cowling.

It should be noted that the consumption measurement is carried out when the cowling is in a static position, that is to say when no command is given via control buttons of the control unit 16a, 16b.

The switchover from a standby mode to a mode for powering up the stages 12, 13a, 13b of the device is produced when a control button of a control unit 16a, 16b is activated.

However, the commands are first checked by the microcontroller 14, in order to identify whether this command is consistent with the position of the cowling 3, 5.

Thus, if a cowling 3, 5 is already closed, a closure command sent from the control unit 16a, 16b will not bring about an exit from the standby mode.

Furthermore, the receipt of a command originating from the actuator control units 16a, 16b will bring about an exit from the standby mode by the microcontroller 14 only when this command has begun after the power supply network 10 has been powered up. Otherwise, a new command will be awaited.

The device 9 also includes means for diagnosing its state.

In particular, this diagnosis can be made by connecting a voltage measuring instrument to the output of a second stage preferably supplying a low power supply voltage, for example of 28 V.

By performing a specific control sequence, for example a sequence of several presses on the buttons, on a control unit 16a, 16b, the device switches to a diagnostic mode, in which specific signal voltage or frequency values are sent to the output of a second stage 13a, 13b. Each value or frequency corresponds to a state of the device, for example to an on state or to a failure state.

The control device 9 is housed in a unit positioned in the fan housing 4.

According to a variant, the unit is positioned in the strut 17 securing the nacelle to the wing of the aircraft, which makes it possible to reduce the thermal stresses on the device.

It goes without saying that the invention is not limited to the single embodiment of the device described hereinabove by way of example, but, on the contrary, encompasses all the variants.

It should be noted in particular that other types of cowling could be controlled by the actuators powered by the device.

The invention claimed is:

1. A device for controlling maintenance of at least one maintenance actuator of cowlings of an aircraft turbojet engine nacelle comprising:
    a first stage to be connected to an electrical power supply network of the aircraft,
    at least one second power stage comprising converters of a first DC voltage originating from the first stage to a second DC voltage for electrically powering at least one maintenance actuator connected downstream of the device,
    a microcontroller to control the first and the at least one second power stage, and
    wires to establish communication between the microcontroller and at least one control unit enabling a user to control operation of the at least one maintenance actuator,
    the microcontroller being arranged to carry out switchovers between a first operating mode in which the alone or all second power stage are powered and a second standby mode in which the alone or all second power stage are not powered by the first stage.

2. The device as claimed in claim 1, wherein the microcontroller is arranged to bring about the switchover from the first operating mode to the second standby mode according to the detection of a state of closure of at least one cowling.

3. The device as claimed in claim 1, wherein the microcontroller is arranged to bring about the switchover from the second standby mode to the first operating mode according to reception of a control instruction from a control unit.

4. The device as claimed in claim 3, wherein the switchover from the second standby mode to the first operating mode is applied only when this control instruction has been initiated after the power supply network has been powered up.

5. The device as claimed in claim 1, wherein at least a portion of the first stage is not powered in a standby mode.

6. The device as claimed in claim 1, wherein an open or closed position of a cowling is detected by comparing energy consumption of the actuator of the cowling and/or of a brake of the actuator with one or more predetermined values.

7. The device as claimed in claim 6, wherein the energy consumption of the at least one maintenance actuator is measured when the cowling is in a static position.

8. The device as claimed in claim 1, further comprising at least two second power stages supplying distinct power supply voltages to distinct at least two maintenance actuators.

9. The device as claimed in claim 1, having a third diagnostic mode in which the device supplies information on its state to an output of the at least one second power stage.

10. The device as claimed in claim 9, wherein the microcontroller bring about the switchover to diagnostic mode of the device upon receipt of a sequence of specific control instructions from at least one control unit.

11. An aircraft nacelle including a device as claimed in claim 1.

12. The nacelle as claimed in claim 11, wherein the device is positioned in a fan housing of the turbojet engine.

13. An aircraft comprising a nacelle, a strut securing the nacelle to a wing of the aircraft, said strut comprising a device as claimed in claim 1.

\* \* \* \* \*